United States Patent
Carr et al.

[19]

[11] Patent Number: 6,023,990
[45] Date of Patent: Feb. 15, 2000

[54] BIMETALLIC GEAR RIM

[76] Inventors: John Carr, 411 Riverview Dr., Walnutport, Pa. 18088; John Gamel, 28 Almond La., Levittown, Pa. 19055; Stephen Lovell, 10371 Old 22, Kutztown, Pa. 19530

[21] Appl. No.: 08/785,462

[22] Filed: Jan. 17, 1997

[51] Int. Cl.$^7$ .......................... F16H 55/06; F16H 55/12
[52] U.S. Cl. ............................ 74/450; 29/893.37
[58] Field of Search .............. 74/450; 29/893.3, 29/893.37; 228/107, 228

[56] References Cited

U.S. PATENT DOCUMENTS

| | | | |
|---|---|---|---|
| 595,553 | 12/1897 | Bissell | 74/450 X |
| 669,211 | 3/1901 | Carlson et al. | 74/450 |
| 825,900 | 7/1906 | Gayer | 74/450 |
| 1,425,042 | 8/1922 | Nutini | 74/450 |
| 1,908,187 | 5/1933 | Ross | 29/893.37 X |
| 2,221,415 | 11/1940 | Short | 29/893.37 |
| 2,756,607 | 7/1956 | Mochel et al. | 29/893.37 X |
| 2,834,102 | 5/1958 | Pflumm et al. | 228/228 X |
| 2,860,409 | 11/1958 | Boessenkool et al. | 228/228 X |
| 3,561,741 | 2/1971 | Richardson | 74/450 X |
| 3,626,779 | 12/1971 | Howard | 29/893.37 X |
| 3,668,768 | 6/1972 | DeCore et al. | 228/107 X |
| 3,742,779 | 7/1973 | Shaver | 74/448 |
| 4,070,920 | 1/1978 | LeBlanc | 74/446 |
| 5,067,649 | 11/1991 | Hardwick | 228/107 |
| 5,122,335 | 6/1992 | Eisenmann | 228/107 X |
| 5,226,579 | 7/1993 | Bergmann et al. | 228/107 |

FOREIGN PATENT DOCUMENTS

| | | | |
|---|---|---|---|
| 97054 | 5/1924 | Germany | 74/450 |

*Primary Examiner*—Charles A. Marmor
*Assistant Examiner*—Scott Lund
*Attorney, Agent, or Firm*—Daniel De Joseph

[57] ABSTRACT

Disclosed is multi-segmented fabricated gear rim having two distinct steel layers, an inner layer, and an outer layer from which gear teeth are cut. The inner and outer layers are molecularly bonded to each other, with the inner layer being a high weldability layer and the outer layer being a high hardenability layer.

11 Claims, 1 Drawing Sheet

SECTION B-B

Fig. 3 SECTION B-B

Fig. 2 SECTION A-A

BIMETALLIC GEAR RIM

SUMMARY OF THE INVENTION

The present invention relates to an unique gear rim, a method for manufacturing such a rim, and a fabricated gear produced utilizing such a rim.

BACKGROUND OF THE INVENTION

Large diameter gears are typically utilized in large comminution machines, e.g. crushing and milling machines, and in kilns. The applications in which such gears are utilized are typically high stress requiring the gear teeth and, obviously, the gear rim to have sufficient hardenability and strength to carry the transmitted load with minimum wear or reduced probability of fracture. Such large diameter gears are generally formed by a casting process, since, in a fabricated gear, the inner gear structure could not be easily welded to the hard gear rim. The reason for this is that typically the weldability of a material is inversely proportionate to hardenability. Therefore, if hardenability is required in the gear teeth as is generally the case for large diameter gears, it would be anticipated that, for fabricated gears, the quality of welds between the inner surface of the gear rim and the substructure of the gear would be poor. If the hardenability in the gear rim is compromised to allow ease of weldability, the gear teeth will generally not have sufficient hardness for the high stress applications.

Therefore, prior to the present invention a casting process was the only practical method to make large gears, i.e., gears having an outer diameter in excess of fourteen feet, for which the gear teeth would be subject to high Hertzian stresses. However, using a casting process to form such large gears is very expensive. In addition, there are only a few foundries in the United States, and in fact, worldwide, that are capable of making such large castings. Furthermore, such large castings would always be potentially be subject to casting defects. Finally, obtaining a large diameter cast gear is a very time consuming process for which it may take up to a year to cast a gear from the time the order was placed. For these and other reasons as described below it would be advantageous to have an alternative method of manufacturing such large gears.

It is an object of the present invention, therefore, to manufacture a gear rim, and further to attach the gear rim by welding to the associated gear substructure, for use in applications, such as material comminution, where exceptional gear teeth hardness is required, while not sacrificing the weld strength between the inner surface of the gear rim and the substructure of the gear. It is a further object of the present invention to manufacture such a gear rim by other than a casting process.

These and other objects are realized by the production of a bimetallic large gear rim in which there is a gear rim provided with two distinct layers, an inner layer having a high weldability and an outer layer having sufficient hardenability into which the gear teeth are cut.

SUMMARY OF THE INVENTION

The present invention relates to a fabricated bimetallic gear rim for use in large gears having a diameter greater than about fourteen feet, and the gear which is constructed therefrom, consisting of two distinct metal layers, namely a high weldability inner layer preferably consisting of a low-carbon to mid-carbon steel to which there is attached a high hardenability outer layer preferably consisting of an alloy steel. As indicated, the low carbon steel utilized in the inner layer will have good weldability characteristics, while the alloy steel outer layer will have high hardenability. The present invention is also directed to a preferred process for forming such a gear rim in which the inner layer and outer layer are bonded to each other via a bonding procedures, either explosive or pressure.

DESCRIPTION OF THE INVENTION

The present invention is directed to the fabrication of large multi-segmented gears. Such gears will typically have a diameter greater than about fourteen feet. Typically, the diameter of the multi-segmented gears fabricated according to the present invention will typically range from about fourteen to about forty feet, although larger diameter gears are contemplated as being embodied by the present invention. In addition, this invention is directed to large diameter gears that are used in applications in which the gear teeth must have a significant hardness. In particular, the large gears that are the subject of the present invention will have utility in crushing, milling and kiln applications for which the gear teeth would be subject to high Hertzian stresses.

Specifically, the invention is directed toward a large multi-segmented gear having a bimetallic rim consisting of two distinctive wrought or forged metal layers that are molecularly bonded to each other. The distinct metal layers consist of (i) a relatively thick high hardenability layer having a hardness number in excess of about 180 Brinell which typically is a wrought steel alloy and (ii) a relatively thin layer having a high weldability which typically is a low carbon steel to which the inner substructure of the gear is welded. The high weldability layer will typically have a hardness number that ranges from about 130 to about 180 Brinell. For any given rim the relatively thin layer will have a higher weldability and a lower hardenability than the thick layer.

The two distinct steel layers utilized to make the gear rim of the present invention will be molecularly bonded to each other. The preferred method of such molecular bonding is an explosive welding procedure. Another method which may be utilized in the present invention to molecularly bond the rim layers to each other is a process comprising rolling the layers under high heat and pressure. By having the layers molecularly bonded to each other the resulting plate will be comprised of two distinct metallic layers in which each layer will have consistent properties through its thickness.

The high hardenability steel which is utilized in the outer layer of the gear rim into which the gear teeth will be cut consists of a alloy steel will have a carbon equivalency of greater than about 0.4, and preferably greater than about 0.6, and will have amounts of other alloy materials such as manganese, nickel, chromium or molybdenum. Typical steels utilized for this purpose will be AISI series 8600, 4100 or 4300. The high weldability steel utilized in the inner surface of the gear rim will be plain carbon steel having a carbon equivalency of less than about 0.4. Typical steels utilized for this purpose are AISI 1000 series steels.

As indicated, the high hardenability and high weldability steels are preferably bonded to each other by an explosive bonding process. The process utilized differs significantly from conventional explosive bonding techniques in that a very thin layer of carbon steel is utilized relative to the thickness of the alloy steel layer. Typically, the ratio of the thickness of alloy steel layer to the carbon steel layer will range from about 10 to 1 to about 30 to 1.

One advantage of the present invention is that all welding of the inner structure of the gear will be to the high weldability low carbon steel layer, with there being no welding to the alloy steel layer, thus eliminating the need for complex welding procedures and associated high temperature preheating and post treating for stress relieving.

In the formation of gears utilizing the present invention, the high weldability steel inner layer may be joined to the high hardenability steel outer layer by an explosive bonding process to form a rectangular bimetallic plate. Typically, pressure ranging from 3 to 4 million psi will be generated by the explosive bonding process. The resulting impact causes hydrodynamic flow and highly location temperatures between the two plate surfaces, thus molecularly bonding the high weldability steel inner layer and the high hardenability steel outer layer inner to each other to form a flat bimetallic plate. The resulting structure will have two distinct metal layers joined at a definite interface layer.

In the explosive bonding process, a relatively thin "flyer plate" is bonded to a thicker "backer plate". In the present invention, the so called "flyer plate" will be the low carbon steel layer and the "backer plate" will be the alloy steel layer. Prior to the bonding procedure the alloy layer is subject to heat treatment to achieve the desired hardness.

The two pieces of metal to be bonded are separated by a stand off distance which is generally about one-quarter to one-half of the "flyer plate" thickness. A buffer plate, made of plastic, rubber, cardboard or even water may be placed between the "flyer plate" and explosive in order to protect the surface finish of the "flyer plate". A layer of explosive, often nitrogen guanidine, amatol, or dynamite, is then placed on the buffer. The explosive is detonated and as it goes off, high pressures develop at the metal—metal interface. If desired, the weld may be ultrasonically inspected to assure a complete and continuous weld.

An alternative, but not as preferred, bonding process for use in the present invention is to bond the high weldability and high hardenability layers to each other via a pressure roll bonding process. In such a process, the two layers are integrally bonded across their interface by roll bonding at high temperature and pressure. The layers are heated to rolling pressure and rolled in a rolling mill where forces of up to ten million pounds are exerted on the layers.

Typically, a large gear rim of the present invention will be then fabricated from a number of flat bimetallic plates, or segments, that may be formed into semi-circular arcs. Obviously, the degree of curvature of the arc will depend on the desired size of the gear to be constructed therefrom. Alternatively, two or more flat bimetallic plates will be joined together to form a structure which will be machined into the desired form of the gear rim.

An advantage of the process of the present invention is that the flat bimetallic plates can be easily stored for forming into the gear rim at a later date.

The high weldability steel layer will comprise the inner layer of the arc and, accordingly, the inner layer of the gear rim formed therefrom. A corresponding portion of the inner structure of the gear, i.e., web, gusset and joint plates, will be welded to the inner high weldability steel layer of the arc. The arcs are then joined together, such as by mechanical fastening, to each other to form a generally circular unit. The gear teeth are then cut into the high hardenability steel plate outer layer of the circular unit to thereby form the completed gear assembly. Generally, 2 or more arcs will be utilized to form a circular unit. It is in this sense that the gears of the present invention are described as being "multi-segmented".

Typically, in the large cast gears of the present invention the gear rims will have a thickness ranging from 4" to about 8" and a width ranging from about 16" to about 48". In certain designs of gears the thickness of a gear rim may vary from place to place on the gear. However, the bimetallic gear rim will in every instance typically be of a thickness that is at least equal to, and preferably at least 1.2 times, the depth of the gear teeth.

DESCRIPTION OF THE DRAWINGS

FIG. 2 depicts a portion of the gear of FIG. 1 along lines A—A.

FIG. 3 depicts a portion of the gear of FIG. 1 along lines B—B.

Like numerals in different Figures refer to similar components. The Figures are not necessarily drawn to scale.

With reference to FIG. 1, there is shown a multi-segmented, fabricated, circular gear rim assembly 10 that consists of two arcs, 11 and 12. The arcs are bolted together at joint plates 11a and 11b (for arc 11) and 12a and 12b (for arc 12). FIG. 1 also depicts gussets 13 which are welded to gear rim 14. Obviously, gear rim 14 as depicted does not have any gear teeth. The gear teeth for gear rim 14 will be machined on surface 14a of gear rim 14.

FIG. 2 depicts that portion of the circular assembly 10 of FIG. 1 along lines A—A. Depicted in FIG. 1 are gear rim 14 having high weldability layer 15 and high hardenability layer 16. Also depicted is plate 17 and joint plate 11b. Bolt holes 19 are located in joint plate 11b.

FIG. 3 depicts a section of gear rim 14 to which there are attached gussets 13, which are also welded to plate 17.

FIG. 4 shows gear rim 14 in greater detail and shows outer high hardenability layer 16 and inner high weldability layer 15 in greater detail.

Figure 1:
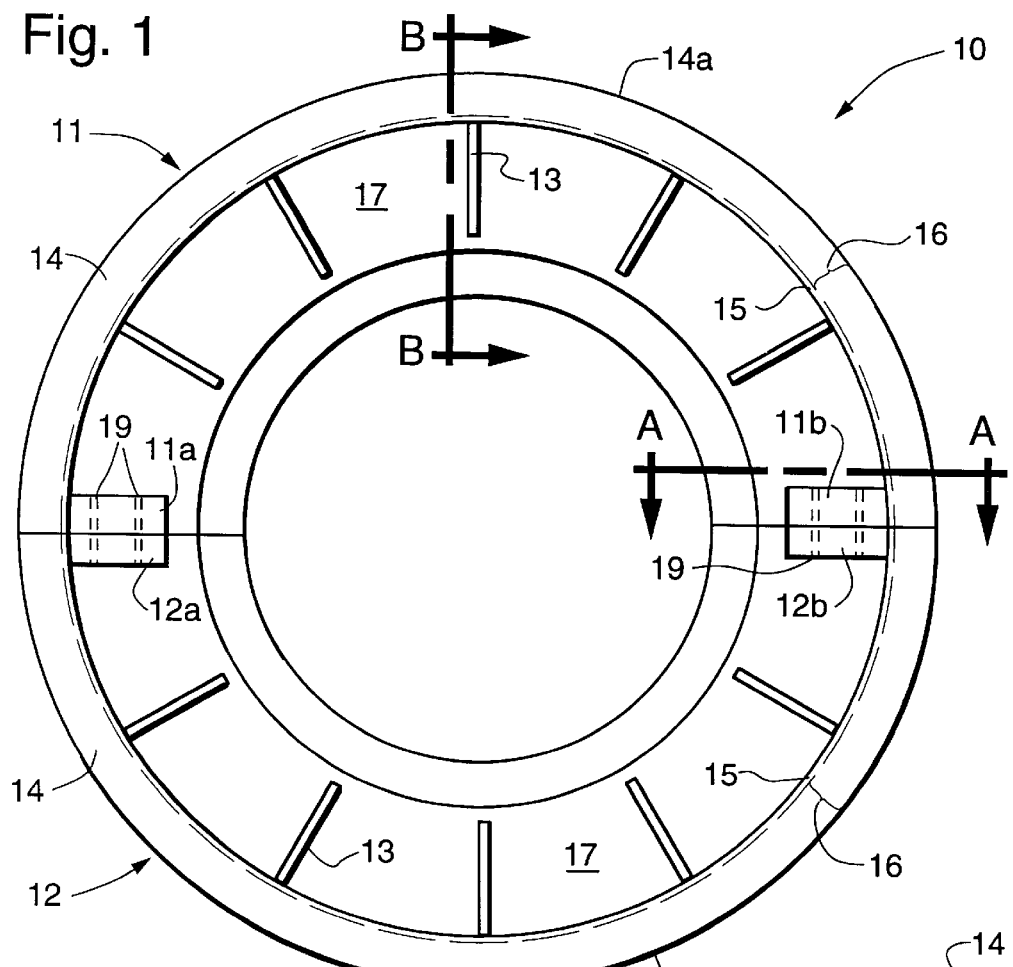
FIG. 1 is a side elevation of a multi-segmented circular assembly of the present invention from which a gear is machined.
Figure 4:
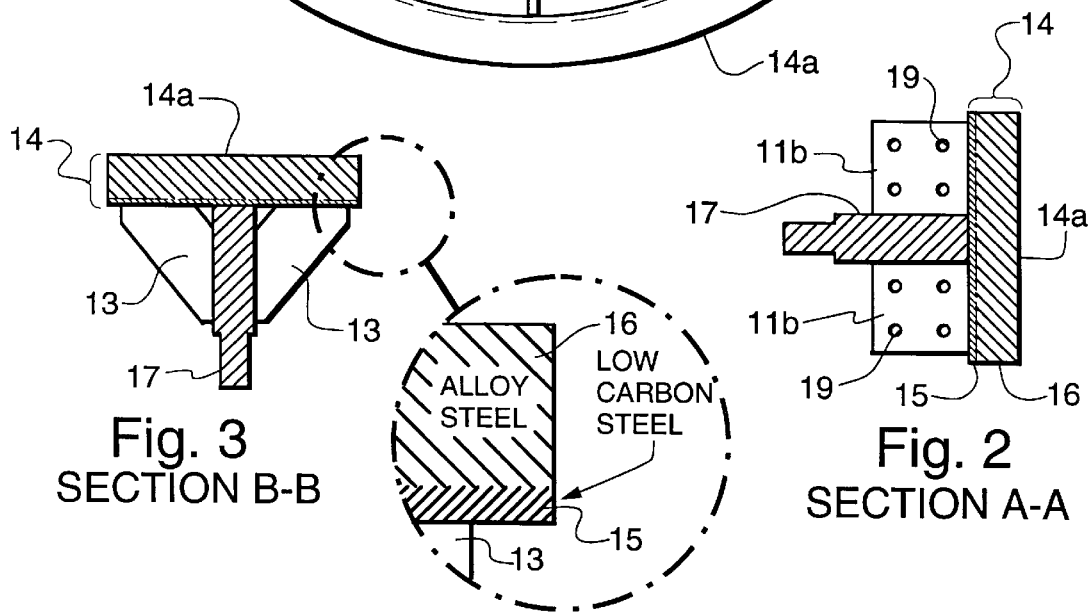
FIG. 4 is a detail of FIG. 3 that depicts the bimetallic gear rim.

While there are shown and described present preferred embodiments of the invention, it is distinctly to be understood that the invention is not limited thereto, but may be otherwise variously embodied and practiced within the scope of the following claims.

What is claimed is:

1. A multi-segmented fabricated gear rim having an outer diameter in excess of about fourteen feet which is formed from a plurality of gear rim plates, with each gear rim plate having two distinct steel layers, (i) an inner layer and (ii) an outer layer from which gear teeth are cut; said inner and outer layers being explosively bonded to each other, wherein, relative to each other, the inner layer is a high weldability layer and the outer layer is a high hardenability layer, and wherein further the outer layer is thicker than the inner layer and the inner layer is coextensive with the outer layer.

2. The gear rim of claim 1 wherein the outer layer has a hardness greater than about 180 Brinell.

3. The gear rim of claim 1 wherein the outer layer is a wrought steel alloy material.

4. The gear rim of claim 1 wherein the outer layer is a forged steel alloy material.

5. The gear rim of claim 1 wherein the inner layer is a wrought low carbon steel layer.

6. The gear rim of claim 1 wherein the inner layer is a forged low carbon steel layer.

7. A multi-segmented fabricated gear rim having an outer diameter in excess of about fourteen feet which is formed from a plurality of gear rim plates, with each gear rim plate having two distinct steel layers, (i) an inner layer and (ii) an outer layer into which gear teeth are cut; said inner and outer layers being explosively bonded to each other, wherein, relative to each other, the inner layer is a low carbon steel high weldability layer and the outer layer is a high hardenability layer formed from a steel alloy material having a hardness of greater than about 180 Brinell, and wherein further the outer layer is thicker than the inner layer and the inner layer is coextensive with the outer layer.

8. The gear rim of claim 7 wherein both the inner and outer layers are wrought layers.

9. The gear rim of claim 7 wherein both the inner and outer layers are forged layers.

10. A multi-segmented fabricated gear which is formed from a plurality of gear rim plates wherein each gear rim plate has two distinct wrought steel layers, an inner layer and an outer layer, said inner and outer layers being explosively bonded to each other, wherein, relative to each other, the inner layer is a high weldability layer and the outer layer, which contains gear teeth, is a high hardenability layer, wherein the inner layer is coextensive with the outer layer, and wherein there is a gear substructure which is welded to the inner layer of each gear rim plate, said substructure being comprised of essentially the same material as the inner layer of the gear rim plates.

11. The gear of claim 10 wherein the outer layer is an alloy steel layer and the inner layer is a carbon steel layer and a ratio of thickness of the alloy steel layer to thickness of the carbon steel layer ranges from about 10 to 1 to about 30 to 1.

* * * * *